United States Patent [19]
Fisher

[11] Patent Number: 5,746,019
[45] Date of Patent: May 5, 1998

[54] HUNTERS SCENT SYSTEM

[75] Inventor: Jeffrey J. Fisher, Moose Lake, Minn.

[73] Assignee: Synergy Technologies, Inc., Moose Lake, Minn.

[21] Appl. No.: 588,778

[22] Filed: Jan. 19, 1996

[51] Int. Cl.⁶ ............................................. A01M 31/00
[52] U.S. Cl. ............................ 43/1; 239/43; 239/47; 239/145
[58] Field of Search .......................... 43/1; 239/34, 37, 239/43, 44, 47, 145

[56] References Cited

U.S. PATENT DOCUMENTS

| | | |
|---|---|---|
| 1,131,575 | 3/1915 | Tuttle . |
| 3,046,192 | 7/1962 | Bilyeu ............................ 167/48 |
| 3,152,352 | 10/1964 | Kosik, Jr. ....................... 401/132 |
| 3,369,543 | 2/1968 | Ronco ............................. 128/269 |
| 3,614,245 | 10/1971 | Schwartzman .................. 401/132 |
| 3,702,677 | 11/1972 | Heffington ....................... 239/55 |
| 3,730,434 | 5/1973 | Engel ............................. 239/47 |
| 3,924,623 | 12/1975 | Avery ............................. 128/269 |
| 4,302,899 | 12/1981 | DeHart ........................... 43/1 |
| 4,609,245 | 9/1986 | Sakschek ........................ 239/36 |
| 4,995,555 | 2/1991 | Woodruff ......................... 239/43 |
| 5,098,297 | 3/1992 | Chari et al. ..................... 433/215 |
| 5,327,667 | 7/1994 | Fore .............................. 43/1 |
| 5,344,670 | 9/1994 | Palmer et al. ................... 427/157 |

*Primary Examiner*—Jeanne Elpel
*Attorney, Agent, or Firm*—Haugen and Nikolai, P.A.

[57] ABSTRACT

An improved scenting system having a frangible vial containing scented liquid disposed within a flexible, moisture-proof sheath member and a wick member having a first end disposed adjacent to the frangible vial and a second end extending from the sheath member, wherein the frangible vial may be broken and the scented liquid released for evaporation by the wick member without the hunter coming into contact with the scented liquid and wherein the scented liquid does not experience unwanted evaporation prior to use.

17 Claims, 3 Drawing Sheets

HUNTERS SCENT SYSTEM

BACKGROUND OF THE INVENTION

I. Field of the Invention

The present invention relates generally to a system for dispensing a scent for use when hunting animals. More particularly, the present invention relates to an improved scenting system having a frangible vial containing scented liquid disposed within a flexible, moisture-proof sheath member and a wick member having a first end disposed adjacent to the frangible vial and a second end extending from the sheath member, wherein the frangible vial may be broken and the scented liquid released for evaporation by the wick member without the hunter coming into contact with the scented liquid and wherein the scented liquid does not experience unwanted evaporation prior to use.

II. Discussion of the Prior Art

The practice of hunting animals is an endeavor which, through time, has enjoyed widespread popularity for both sustenance and sport. This pursuit typically involves a hunter lying in wait for game to travel therepast or, conversely, a hunter actively stalking his prey. To improve the likelihood of success, hunters have for years used various scents to attract game and/or mask the scent of the hunter so that the hunted animal does not become alerted to the presence of the hunter. The particular choice of scent, of course, depends upon the given animal being hunted and may include, among others, musk, deer urine, raccoon urine, fox urine, acorn scent, pine scent, and skunk scent.

Various efforts have been undertaken to provide convenient devices for dispensing such animal scents. For example, U.S. Pat. No. 5,327,667 to Fore discloses a scent dispensing device which is adhesively secured to the foot of the hunter and capable of emitting an odor to attract deer to the hunter. A frangible vial containing scented liquid is disposed between opposing upper and lower plastic strips. The upper strip has a perforated portion and the lower strip has adhesive for attachment to the hunter. A thin layer of absorbent material is disposed between the frangible vial and the perforated portion. To dispense the scent, the hunter must apply pressure to the perforated portion of the upper plastic strip in order to crack the interiorly disposed frangible vial. Scented liquid from the vial then seeps into the absorbent layer for evaporation through the perforated middle portion.

The device of the '667 patent, however, has several significant drawbacks. First, the hunter must necessarily come into contact with the scented liquid when cracking the frangible vial. This is due to the perforated middle portion of the upper strip which, as described above, allows the scented liquid to seep therethrough to contact the hunter as he applies pressure to the frangible vial. Similarly, the scented liquid may seep outward from the perforated middle portion and onto the actual clothing or boots of the hunter during use due to the relatively thin layer of absorbent material. Moreover, the entire volume of scented liquid is exposed to the absorbent material at one time, which, in turn, increases the degree to which the scented liquid experiences evaporation through the perforated middle portion. This effectively decreases the amount of time that the device is capable of adequately emitting the desired hunting scent or odor.

U.S. Pat. No. 4,609,245 to Sakschek discloses yet another type of scent dispensing system, resembling a felt-tip pen or marker that is common in the art. A pen-shaped receptacle is provided having an internally disposed reservoir for containing a volume of scented liquid therein. A microporous conduit extends from the reservoir to an externally disposed dispensing tip for drawing the scented liquid outward from the reservoir via capillary action for evaporation at the dispensing tip. A cap is provided for placement over the dispensing tip. However, this device suffers a significant flaw in that, even with the cap placed over the dispensing tip, the scented liquid experiences unwanted evaporation during storage due to the fact that there is always some exposure to the air within the cap. This effectively reduces the effective lifespan of the dispensing system.

A need therefore exists for a device for dispensing a scent which does not cause the hunter to come into physical contact with the scented liquid and which does not experience unwanted evaporation prior to use.

OBJECTS AND SUMMARY OF THE INVENTION

Accordingly, it is a primary object of the present invention to provide a scent dispensing system that allows the hunter to activate the dispensing of a scented liquid for evaporation without coming into physical contact with the scented liquid.

It is another object of the present invention to provide a scent dispensing system that does not experience unwanted evaporation of the scented liquid prior to use.

It is yet another object of the present invention to provide a scent dispensing system that is easy to dispose of following use without contaminating the hunter with scented liquid.

It is still another object of the present invention to provide a scent dispensing system that is compact in size and economical to manufacture.

In accordance with a broad aspect of the present invention, an apparatus is provided for dispensing a scent, comprising flexible sheath means of moisture impermeable construction having an internal cavity and an aperture in communication with the internal cavity. Frangible container means are disposed within the internal cavity of the sheath means with the frangible container means having a predetermined amount of scented liquid disposed therein. Wick means are further provided having a first end disposed in adjacent relation to the frangible container means and a second end extending through the aperture of the sheath means, wherein the wick means is capable of drawing the scented liquid out the aperture for evaporation when the sheath means is flexed to break the frangible container means.

In yet another broad aspect of the present invention, a method of dispensing a scent, comprising the steps of: (a) providing a dispensing system comprising a flexible sheath member having an internal cavity and an aperture disposed in communication with the internal cavity, a frangible container member disposed within the internal cavity having a predetermined amount of scented liquid disposed therein, and a wick member having a first end disposed proximate the frangible container member and a second end extending out the aperture of the sheath member; (b) breaking the frangible container within the sheath member to dispense the scented liquid; and (c) allowing the scented liquid to flow through the wick member for evaporation at the second end of the wick member.

According to still another broad aspect of the present invention, an apparatus is provided for dispensing a scent into the atmosphere, comprising a sheath member of moisture impermeable and generally flexible construction having a closed first end, an open second end having a circular aperture formed therein, and an internal cavity formed between the closed first end and the open second end. A frangible container is further provided of moisture impermeable construction and disposed within the internal cavity of the sheath member, the frangible container having a first end, a second end, and an internal cavity formed therebetween having a predetermined volume of scented liquid disposed therein. A wick member having a first end and a second end is also provided, the wick member being fixedly attached to the internal cavity of the sheath member proximate the aperture so as to enclose the frangible container within the internal cavity. Scent may be dispensed by breaking the frangible container within the internal cavity of the sheath member such that the scented liquid flows from the first end of the wick member toward the second end of the wick member for evaporation into the atmosphere.

DETAILED DESCRIPTION OF THE PREFERRED EMBODIMENTS

Figure 1:
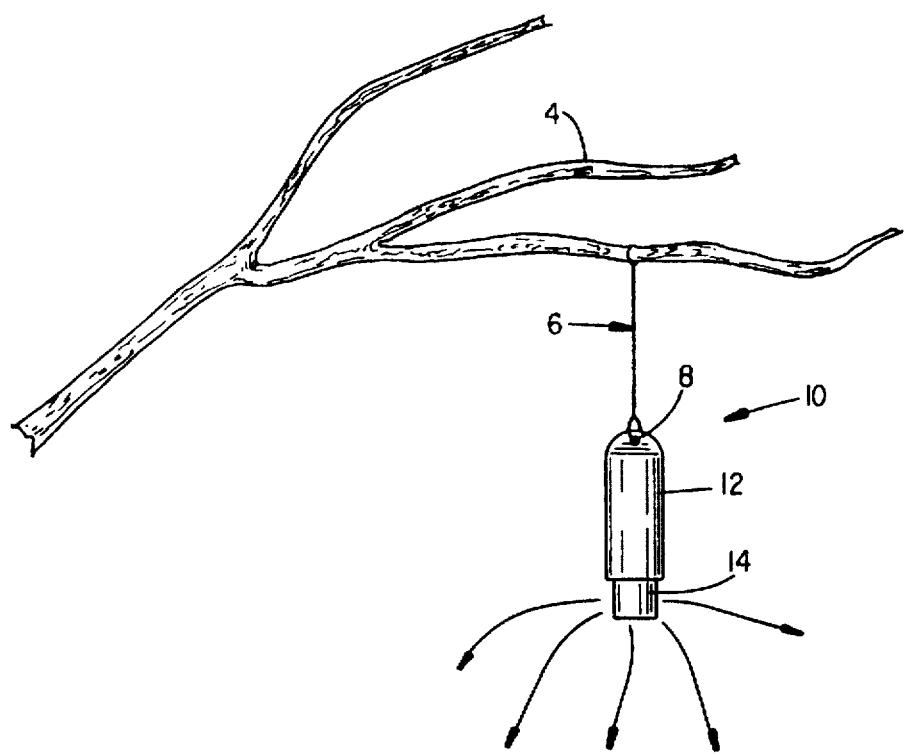
FIG. 1 is a side view of a scent dispensing system 10 of the present invention hanging from a tree limb 4.

Referring initially to FIG. 1, a scent dispensing system 10 of the present invention is shown hanging from a tree limb 4, as may be found in a typical application of the present invention. In this embodiment, scent dispensing system 10 is suspended from tree limb 4 through the use of a string member 6 having a first end attached to tree limb 4 and a second end attached to a loop hole 8 formed at an upper end of scent dispensing system 10. Although not shown, it is to be readily understood that the string member 6 may be replaced by any number of alternate means for attaching the scent dispensing system 10 to an object, including but not limited to a hook member.

Figure 2:
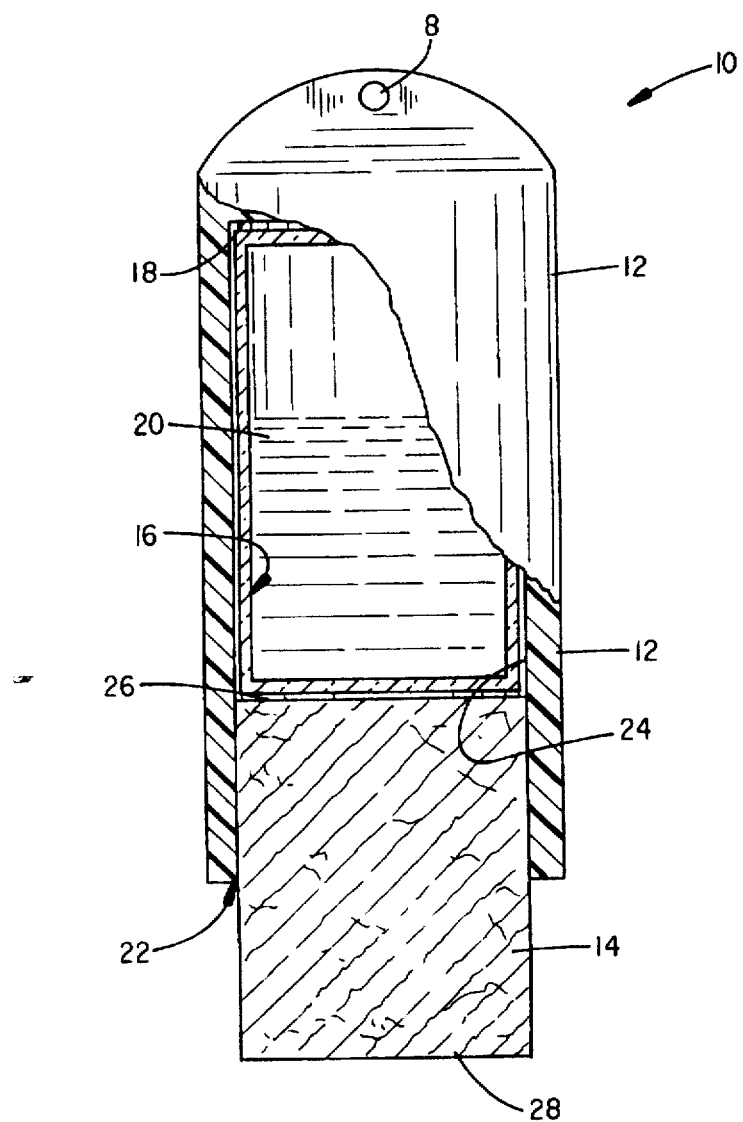
FIG. 2 is a partial sectional view of a first preferred embodiment of the scent dispensing system 10 of the present invention.

With collective reference to FIGS. 1 and 2, scent dispensing system 10 includes a sheath member 12 of unibody construction having a generally cylindrical shape and an internal cavity 24 formed therewithin. Internal cavity 24 extends substantially the entire length of sheath member 12 between a sealed upper surface 18 and an aperture 22 formed at the lower end of sheath member 12. Sheath member 12 may be constructed from any variety of materials that are generally flexible and impervious to moisture, including but not limited to plastic. A generally cylindrical frangible container 16 is positioned within internal cavity 24 so as to form a generally flush relationship with sealed upper surface 18. Frangible container 16 has an internal chamber filled with a predetermined volume of scented liquid 20 and may be manufactured from one of several breakable and moisture impermeable materials, including but not limited to glass, polyethylene, wax and plastic. A generally cylindrical wick member 14 is partially disposed within internal cavity 24 of sheath member 12 with a first end 26 positioned generally flush with frangible container 16 and a second end 28 extending from aperture 22. Wick member 14 may be constructed of any variety of absorbent materials, such as cotton fibers, polyester fibers, or gauze material, and is securely adhered within internal cavity 24 such that the only path out of internal cavity 24 is through wick member 14.

Prior to use, frangible container 16 is maintained in an unbroken condition within internal cavity 24 of sheath member 12 such that the predetermined volume of scented liquid 20 is sealed from the atmosphere within frangible container 16. Due to the moisture impermeable construction of frangible container 16, no odor or scent is emitted or dispensed from scent dispensing system 10 in this condition. Moreover, the moisture impermeable construction of frangible container 16 ensures that the predetermined volume of scented liquid 20 will not experience any evaporation or drying up within frangible container 16 prior to use. In so doing, scent dispensing system 10 of the present invention has a virtually endless shelf-life in that it is capable of being stored for great lengths of time without losing the ability to dispense the scented liquid 20 at a moments notice.

When it is desired to release the scented liquid 20 for eventual evaporation into the atmosphere, an external pressure is required to be applied to sheath member 12 proximate frangible container 16 in order to break frangible container 16. Scent dispensing system 10 of the present invention may be constructed in a variety of lengths and widths depending upon the application. However, in an important aspect of the present invention, sheath member 12 is of such construction and size that the hunter may effectuate the breaking of frangible container 16 without coming in contact with wick member 14. That is, sheath member 12 is of sufficient length such that the hunter, when attempting to break the frangible vial, need only apply pressure to the exterior surface of sheath member 12 without contacting wick member 14. In so doing, sheath member 12 forms a protective barrier between the newly released scented liquid 20 within internal cavity 24 from any physical contact with the user. In a preferred embodiment, scent dispensing system 10 will be of a size to accommodate such breaking of frangible container 16 between the thumb and forefinger of the hunter. Once again, this eliminates any possibility that the hunter will come into unwanted contact with the scented liquid 20 during the breaking of frangible container 16.

With frangible container 16 in a broken or fractured condition, the scented liquid 20 flows therefrom into internal cavity 24 of sheath member 12 and into contact with first end 26 of wick member 14. The absorbent nature of wick member 14 serves to slowly draw the scented liquid 20 through wick member 14 toward second end 28. This outward flow of scented liquid 20 is further facilitated by positioning scent dispensing system 10 as shown in FIG. 1 such that the force of gravity draws the scented liquid 20 down wick member 14 for evaporation into the atmosphere. In a preferred embodiment, wick member 14 comprises a compactly formed bundle of cotton or polyester fibers. Due to this compact construction and the snug positioning of wick member 14 within internal cavity 24, the present invention restricts the outward flow of scented fluid 20 through wick member 14 at a slow and drawn out pace. This serves to increase the amount of time that scent dispensing system 10 will be able to effectively dispense the scented liquid 20 for evaporation into the atmosphere.

Figure 3:
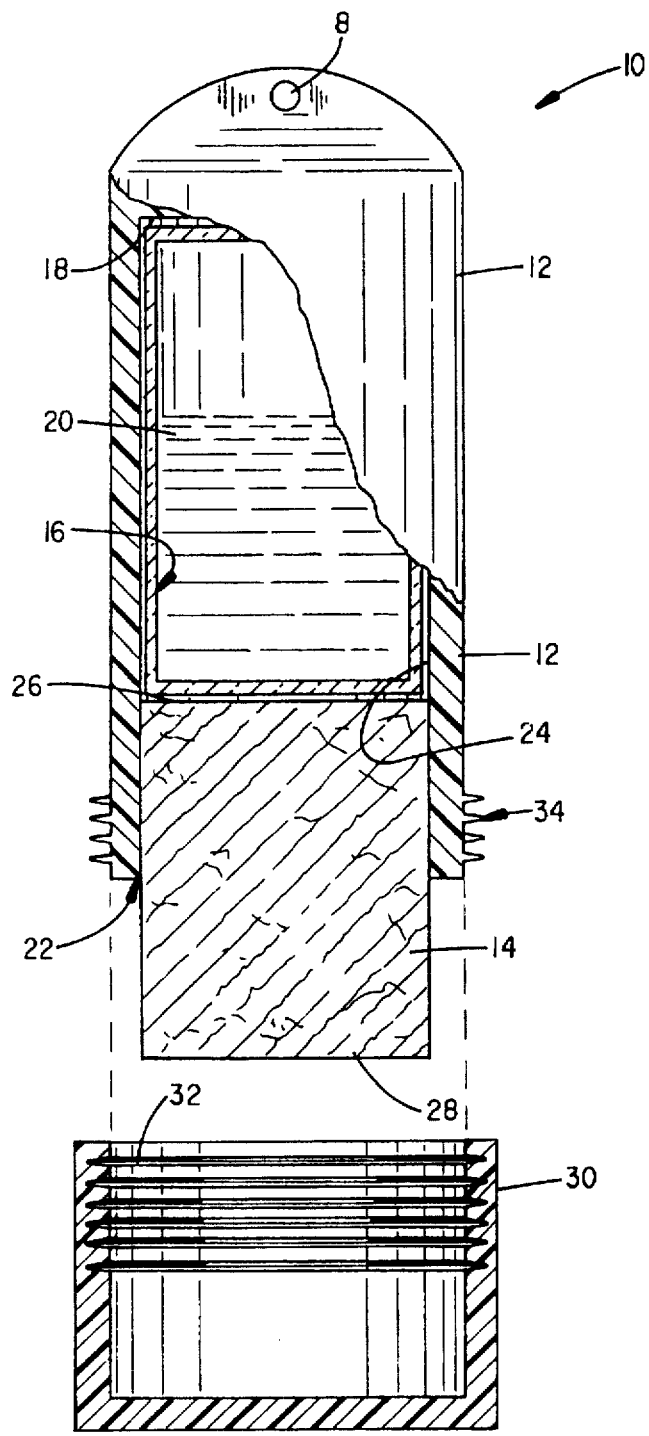
FIG. 3 is a partial sectional view of a second preferred embodiment of the scent dispensing system 10 of the present invention.

Referring now to FIG. 3, shown is an alternate embodiment of the present invention. In this embodiment, scent dispensing system 10 includes a cap member 30 for enclosing wick member 14 following use. To accomplish this, cap member 30 includes a spiral groove 32 formed along the interior surface thereof for threaded engagement with a spiral thread 34 formed on the exterior surface of sheath member 12. The interior surface of cap member 30 and the exterior surface of sheath member 12 have approximately the same diameter such that cap member 30 may be screwed onto sheath member 12 in a conventional manner to provide an airtight seal therebetween. In so doing, the a hunter may easily enclose wick member 14 following use by simply threadably engaging spiral groove 32 and spiral thread 34 and twisting cap member 30 about the longitudinal axis of sheath member 12 so as to seal off wick member 14 from the atmosphere.

This sealing feature of the present invention serves several important and beneficial functions. First, sealing off wick member 14 effectively minimizes the risk that a hunter will come into unwanted contact with wick member 14 during the removal of scent dispensing system 10 from the site of use. This allows the hunter to transport scent dispensing system 10 to an appropriate disposal location without contaminating his or her body, clothes, or motor vehicle with the scent present on the portion of wick member 14 that extends past aperture 22 of sheath member 12 during use. By minimizing the potential for undesirable contamination, the present invention indirectly encourages hunters to remove such scenting systems from the site of use in that the hunters need not be concerned with the prospect of becoming tainted with scent during disposal of scent dispensing system 10 and, hence, will be more likely to properly dispose of the scent dispensing system 10 than abandon it in the woods. As a consequence, the number of scent dispensing systems 10 that are left in the hunting grounds will be minimized, thereby aiding in the struggle to maintain the environment in a natural state unencumbered by trash and refuse. This also furthers proper hunting etiquette in that such scenting systems should be removed from the particular dispensing site 60 that the wild animals do not become desensitized to the presence of scent in that location. Therefore, with more hunters removing the scenting systems from the woods, the lower the number of wild animals that will become desensitized to scenting systems that have been abandoned. This has the overall effect of improving the ability of hunters to effectively deploy scenting systems in the woods which, in turn, will result in improved success rates in hunting wild game.

Another advantage of sealing off wick member 14 through the use of cap member 30 is that scent dispensing system 10 may be closed after an initial use for subsequent deployment. As noted earlier, frangible container 16 is constructed of moisture impermeable material such that, prior to being broken, scented liquid 20 is incapable of being smelled or detected by a person or wild animal. After frangible container 16 is broken by a user, scented liquid 20 flows into contact with internal cavity 24 of sheath member 12 and upper end 26 of wick member 14. Due to the compact construction of wick member 14, scented liquid 20 flows very slowly from first end 26 toward second end 28 for evaporation into the atmosphere. Thus, scent dispensing system 10 of the present invention is capable of emanating scent into the atmosphere for up to several hours and/or days. However, this time period may be lengthened through the use of cap member 30 in that, by sealably enclosing wick member 14 with cap member 30, a hunter can decrease the amount to which scented liquid 20 evaporates from within internal cavity 24 of sheath member 12. In so doing, cap member 30 of the present invention provides the ability to extend the effective lifespan of scent dispensing system 10, which, in an environmentally conscious turn, reduces the amount of raw materials used in producing such scenting systems.

From the foregoing it should now be recognized that methods and apparatus therefor have been advantageously provided herein enabling a hunter to selectively dispense a scent for use in hunting without coming into physical contact with the scented liquid and which does not experience unwanted evaporation prior to use. Apparatus in accordance with the aforementioned invention can be manufactured economically from various readily available materials and may be disposed of in a trouble-free and expedient manner so as to maintain the natural beauty the hunting grounds following use.

The preferred apparatus embodiments depicted herein are exemplary and numerous modifications, dimensional variations, and rearrangements can be readily envisioned to achieve an equivalent result, all of which are intended to be embraced within the scope of the appended claims.

What is claimed is:

1. An apparatus for dispensing a scent, comprising:
   flexible sheath means of moisture impermeable construction having a generally cylindrical shape with a sealed first end disposed opposite an open second end, an internal cavity disposed between said sealed first end and said open second end, and an aperture defined by said open second end in communication with said internal cavity
   frangible container means disposed within said internal cavity of said sheath means, said frangible container means having a predetermined amount of scented liquid disposed therein:
   wick means having a first end disposed in adjacent relation to said frangible container means and a second end extending through said aperture of said sheath means, wherein said wick means is capable of drawing said scented liquid out said aperture for evaporation when said sheath means is flexed to break said frangible container means: and
   attachment means coupled to said flexible sheath means for attaching said flexible sheath means to an object.

2. The apparatus set forth in claim 1 and further, said frangible container means comprising a frangible capsule having a generally cylindrical shape with a first end disposed opposite a second end, said first end of said frangible capsule being disposed proximate said first end of said sheath means and said second end of said frangible capsule being disposed proximate said first end of said wick means.

3. The apparatus set forth in claim 2 and further, wherein said frangible capsule consists of one of glass, polyethylene, wax, and plastic.

4. The apparatus set forth in claim 3 and further, said wick means consisting of one of cotton, gauze, and polyester fibers.

5. The apparatus set forth in claim 4 and further, including sealing means for enclosing said second end of said wick means after said frangible capsule has been broken to release said scented liquid.

6. The apparatus set forth in claim 5, said sealing means comprising a cap member for placement over said second end of said sheath means to encapsulate said wick means and seal said aperture from the atmosphere.

7. The apparatus set forth in claim 1, said flexible sheath means including an attachment aperture formed proximate said sealed first end of said sheath means for coupling said attachment means to said flexible sheath means.

8. The apparatus set forth in claim 7 and further, said attachment means being disposed in cooperating relationship with said attachment aperture of said flexible sheath means.

9. The apparatus set forth in claim 8 and further, said attachment means consisting of one of a string member and a hook member.

10. The apparatus set forth in claim 9, said sheath means being constructed from a material consisting of one of plastic and metal.

11. A method for dispensing a scent, comprising the steps of:
   (a) providing a dispensing system comprising a flexible sheath member having an internal cavity and an aperture disposed in communication with said internal cavity, a frangible container member disposed within said internal cavity having a predetermined amount of scented liquid disposed therein, a wick member having a first end disposed proximate said frangible container member and a second end extending out said aperture of said sheath member, and attachment means coupled to said sheath member for attaching said dispensing system to an object;
   (b) breaking said frangible container within said sheath member to dispense said scented liquid: and
   (c) allowing said scented liquid to flow through said wick member for evaporation at said second end of said wick member.

12. The method set forth in claim 11 and further, step (b) including the sub-step of applying pressure to an exterior surface of said sheath member to force an interior surface of said sheath member into contact with said frangible container member to thereby crack said frangible container member.

13. An apparatus for dispensing a scent into the atmosphere, comprising:
   a sheath member of moisture impermeable and generally flexible construction having a closed first end, an open second end having a circular aperture formed therein, and an internal cavity formed between said closed first end and said open second end;
   a frangible container of moisture impermeable construction disposed within said internal cavity of said sheath member, said frangible container having a first end, a second end, and an internal cavity formed therebetween having a predetermined volume of scented liquid disposed therein;
   a wick member having a first end and a second end, said wick member being fixedly attached to said internal cavity of said sheath member proximate said aperture so as to enclose said frangible container within said internal cavity, wherein scent may be dispensed by breaking said frangible container within said internal cavity of said sheath member such that said scented liquid flows from said first end of said wick member toward said second end of said wick member for evaporation into the atmosphere and
   attachment means coupled to said sheath member for attaching said sheath member to an object.

14. The apparatus as set forth in claim 13 and further, wherein said wick member is positioned within said sheath member such that said first end of said wick member is generally adjacent to said second end of said frangible container and said second end of said wick member extends a predetermined distance past said aperture.

15. The apparatus as set forth in claim 13 and further, said sheath member including engagement means disposed proximate said second end of said sheath member, and further comprising a cap member having an aperture and engagement means for sealably coupling said cap member to said engagement means of said sheath member to enclose said wick member from the atmosphere.

16. The apparatus as set forth in claim 15, said engagement means of said cap member comprising a spiral groove proximate said aperture of said cap member, said engagement means of said sheath member comprising a spiral thread formed proximate said aperture of said sheath member capable of being threadably received within said spiral groove of said cap member.

17. The apparatus as set forth in claim 16 and further, wherein said sheath member, said frangible container, said wick member, and said cap member are generally cylindrical in shape.

* * * * *